(12) United States Patent
Park et al.

(10) Patent No.: US 8,755,292 B2
(45) Date of Patent: Jun. 17, 2014

(54) APPARATUS AND METHOD FOR CONTROLLING UPLINK TRANSMISSION POWER IN A COMMUNICATION SYSTEM

(75) Inventors: Jeong-Ho Park, Seoul (KR); Jae-Hee Cho, Seoul (KR); Hyun-Kyu Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 12/944,942

(22) Filed: Nov. 12, 2010

(65) Prior Publication Data

US 2011/0116400 A1 May 19, 2011

(30) Foreign Application Priority Data

Nov. 14, 2009 (KR) .................. 10-2009-0110016

(51) Int. Cl.
*H04B 7/00* (2006.01)
(52) U.S. Cl.
USPC .............. 370/252; 370/329; 455/522; 455/69
(58) Field of Classification Search
USPC ......... 370/229–232, 252, 253, 310, 311, 328, 370/329, 341, 468; 455/522, 69
See application file for complete search history.

(56) References Cited

U.S. PATENT DOCUMENTS

| | | | |
|---|---|---|---|
| 6,577,617 B1 | 6/2003 | Ue et al. | |
| 8,279,806 B2 * | 10/2012 | Sagfors et al. | 370/328 |
| 8,340,593 B2 * | 12/2012 | Yang et al. | 455/69 |
| 8,359,059 B2 * | 1/2013 | Kim et al. | 455/522 |
| 8,483,742 B2 * | 7/2013 | Kim et al. | 455/522 |
| 2006/0046789 A1 * | 3/2006 | Huh et al. | 455/571 |
| 2008/0200200 A1 * | 8/2008 | Usuda et al. | 455/522 |
| 2009/0181714 A1 * | 7/2009 | Yajima et al. | 455/522 |
| 2010/0103901 A1 * | 4/2010 | Miki et al. | 370/330 |
| 2010/0296459 A1 * | 11/2010 | Miki et al. | 370/329 |
| 2011/0002279 A1 * | 1/2011 | Yang et al. | 370/329 |
| 2011/0098076 A1 * | 4/2011 | Kim et al. | 455/522 |
| 2011/0111788 A1 * | 5/2011 | Damnjanovic et al. | 455/522 |
| 2011/0117953 A1 * | 5/2011 | Kim et al. | 455/522 |
| 2011/0194423 A1 * | 8/2011 | Cho et al. | 370/252 |
| 2013/0109432 A1 * | 5/2013 | Yang et al. | 455/522 |

FOREIGN PATENT DOCUMENTS

| | | | |
|---|---|---|---|
| JP | 11-275035 A | | 10/1999 |
| JP | 2007-13763 A | | 1/2007 |
| JP | 2010-521122 A | | 6/2010 |
| JP | 2011519504 A | | 7/2011 |
| KR | 10-0595173 B1 | | 7/2006 |
| WO | 99/08339 A2 | | 2/1999 |
| WO | 2008/112580 A2 | | 9/2008 |
| WO | 2008/136459 A1 | | 11/2008 |
| WO | WO 2008/136459 | * | 11/2008 |
| WO | 2009/120126 A1 | | 10/2009 |

* cited by examiner

*Primary Examiner* — Kerri Rose
(74) *Attorney, Agent, or Firm* — Jefferson IP Law, LLP

(57) ABSTRACT

An apparatus and method for controlling uplink transmission power in a communication system are provided. In the method, transmission power of an uplink data channel signal is determined according to an Open Loop Power Control (OLPC) scheme and transmission power of an uplink control channel signal is determined according to a Closed Loop Power Control (CLPC) scheme.

78 Claims, 3 Drawing Sheets

APPARATUS AND METHOD FOR CONTROLLING UPLINK TRANSMISSION POWER IN A COMMUNICATION SYSTEM

PRIORITY

This application claims the benefit under 35 U.S.C. §119(a) of Korean patent application filed in the Korean Intellectual Property Office on Nov. 14, 2009 and assigned Serial No. 10-2009-0110016, the entire disclosure of which is hereby incorporated by reference.

BACKGROUND OF THE INVENTION

1. Field of the Invention

The present invention relates to an apparatus and method for controlling transmission parameters in a communication system. More particularly, the present invention relates to an apparatus and method for controlling uplink transmission power in a communication system.

2. Description of the Related Art

A communication system generally controls downlink and uplink transmission power in consideration of system capacity and service quality. Uplink transmission power control schemes are largely classified into Open Loop Power Control (OLPC) and Closed Loop Power Control (CLPC). In general, CLPC is used to compensate for short-term fading, whereas OLPC is used to compensate for parameters other than short-term fading, for example, large scale parameters such as path loss, shadowing, etc.

The following uplink transmission power control operations are performed in conventional communication systems.

A Code Division Multiple Access (CDMA) communication system controls uplink transmission power using both OLPC and CLPC.

An Orthogonal Frequency Division Multiple Access (OFDMA) communication system controls uplink transmission power using one of OLPC and CLPC. More specifically, for a Mobile Station (MS), an uplink transmission power control operation is performed using CLPC and then OLPC, or using OLPC and then CLPC.

As described above, the existing communication systems use OLPC, CLPC, or both in controlling uplink transmission power. However, they do not differentiate between the uplink transmission power used for different channels.

SUMMARY OF THE INVENTION

An aspect of the present invention is to address at least the above-mentioned problems and/or disadvantages and to provide at least the advantages described below. Accordingly, an aspect of the present invention is to provide an apparatus and method for controlling uplink transmission power in a communication system.

Another aspect of the present invention is to provide an apparatus and method for performing a differentiated uplink transmission power control operation for different channels in a communication system.

In accordance with an aspect of the present invention, a Mobile Station (MS) in a communication system is provided. The MS includes a controller for determining transmission power of an uplink data channel signal according to an Open Loop Power Control (OLPC) scheme and for determining transmission power of an uplink control channel signal according to a Closed Loop Power Control (CLPC) scheme.

In accordance with another aspect of the present invention, a method for controlling uplink transmission power at an MS in a communication system is provided. The method includes determining transmission power of an uplink data channel signal according to an OLPC scheme, and determining transmission power of an uplink control channel signal according to a CLPC scheme.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
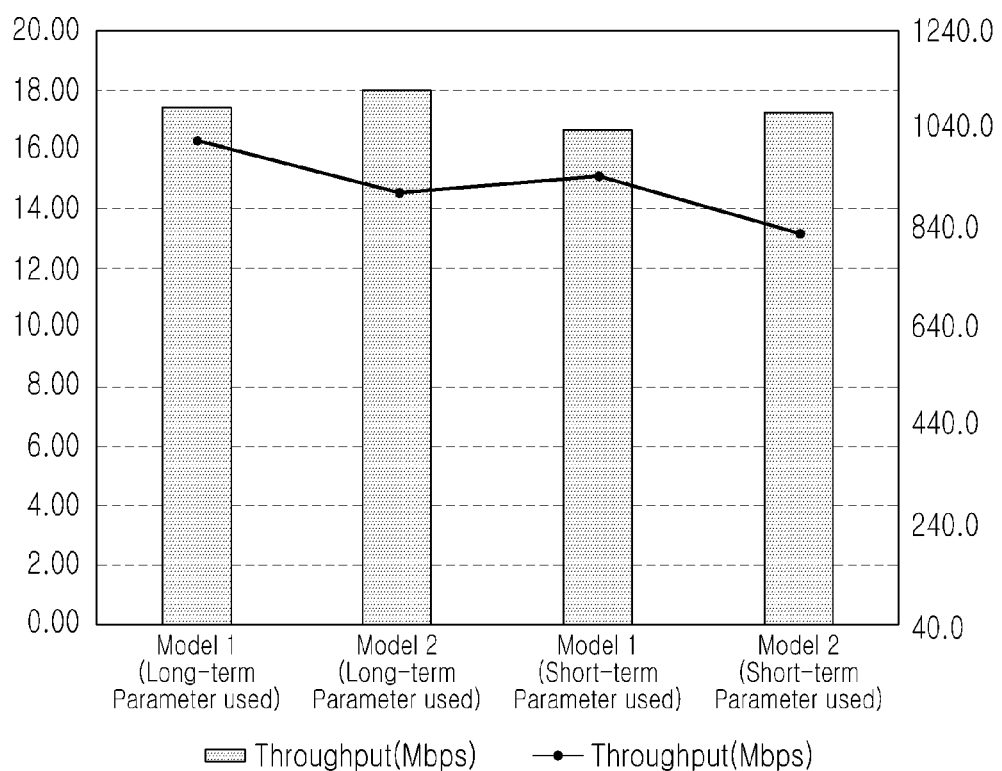
FIG. 1 is a graph comparing short-term fading compensation with short-term fading non-compensation in terms of performance, when the transmission power of an uplink data channel is controlled using Open Loop Power Control (OLPC) and Closed Loop Power Control (CLPC) in a conventional Orthogonal Frequency Division Multiple Access (OFDMA) communication system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and method for controlling uplink transmission power in a communication system. Exemplary embodiments of the present invention further provide an apparatus and method for performing a differential uplink transmission power control operation for different channel in a communication system. It is assumed herein that the communication system is an Orthogonal Frequency Division Multiple Access (OFDMA) communication system. However, this is by way of example only and not intended to be limiting. That is, it is to be clearly understood that the apparatus and method for controlling uplink transmission power according to the present invention is also applicable to other communication systems. In addition, the apparatus and method for controlling uplink transmission power according to the present invention are useful in a communication system in which each channel has a different parameter to be compensated for, that is, each channel has a different characteristic.

Communication systems generally use the same transmission power control scheme for different channels. In the following description, the different channels are assumed to be an uplink data channel and an uplink control channel. In a Code Division Multiple Access (CDMA) communication system, for example, a Mobile Station (MS) controls the uplink transmission power of the uplink data channel and the uplink control channel, using Open Loop Power Control (OLPC) and Closed Loop Power Control (CLPC) simultaneously. In an OFDMA communication system, an MS controls the uplink transmission power of the uplink data channel and the uplink transmission power of the uplink control channel using either of OLPC and CLPC. That is, one thing in common between the CDMA and OFDMA communication systems is that uplink transmission power control is performed without a distinction between the uplink data channel and the uplink control channel.

Meanwhile, a circuit-switched communication system optimizes uplink system performance by compensating for short-term fading through uplink power control. On the other hand, a packet-switched communication system can optimize uplink system performance through link adaptation, instead of short-term fading compensation. Besides link adaptation, the OFDMA communication system enables rate control using Hybrid Automatic Repeat reQuest (HARQ). The rate control may also optimize uplink system performance.

If an OFDMA communication system is a multi-cellular system, Inter-Cell Interference (ICI) significantly affects uplink system performance, particularly system performance at the edge of a cell. Therefore, interference level control, which keeps the mean and variance of interference low, is critical. Considering an interference level, short-term fading compensation through uplink power control causes fluctuations in output power with respect to fading for individual MSs, thus adversely affecting the variance of interference. Accordingly, maintaining output power substantially constant at an MS is favorable in terms of interference variance, thereby optimizing uplink system performance in the multi-cellular OFDMA communication system.

Now, with reference to FIG. 1, a comparison will be made between short-term fading compensation and short-term fading non-compensation in terms of performance, when the transmission power of an uplink data channel is controlled using OLPC and CLPC in an OFDMA communication system.

FIG. 1 is a graph comparing short-term fading compensation with short-term fading non-compensation in terms of performance, when the transmission power of an uplink data channel is controlled using OLPC and CLPC in a conventional OFDMA communication system.

Referring to FIG. 1, Model 1 represents a case of using OLPC and Model 2 represents a case of using CLPC. The performance graph illustrated in FIG. 1 represents performance when HARQ and link adaptation are applied to an uplink data channel. The bar graph represents sector throughput and the line graph represents edge throughput. As noted from FIG. 1, a performance increase of about 10% is achieved through the short-term fading non-compensation, relative to the short-term fading compensation, in both sector throughput and edge throughput.

Unlike the uplink data channel, HARQ and link adaptation are not used for an uplink control channel. To satisfy a Target Error Rate (TER) for the uplink control channel, a required Signal-to-Interference and Noise Ratio (SINR) should be maintained. Therefore, short-term fading compensation is essential to the uplink control channel, unlike the uplink data channel.

In view of the above, the OFDMA communication system should optimize uplink system performance by selectively applying uplink power control schemes to the uplink data channel and the uplink control channel. Hence, exemplary embodiments of the present invention provide differential uplink power control schemes for the uplink data channel and the uplink control channel, as described below.

First, the transmission power of the uplink data channel is controlled by Equation (1):

$$P\_data(dBm) = NI + L_1 + SINR_{Target} + \text{Offset} \quad (1)$$

where P_data denotes an uplink transmission power per subcarrier of an uplink data channel region allocated to an MS, NI denotes an interference and noise level per subcarrier, $L_1$ denotes path loss on a link between the MS and a serving Base Station (BS), $SINR_{Target}$ denotes a target uplink reception SINR, and Offset denotes an offset value with which to calibrate the uplink transmission power of the uplink data channel signal. Herein, P_data and NI are expressed in dBm and the serving BS broadcasts P_data and NI. The MS receives a measurement-related parameter and determines $L_1$ using the received measurement-related parameter. $L_1$ is expressed in dB. $SINR_{Target}$ and Offset, which are expressed in dB, may be changed by the serving BS.

Equation (1) is determined according to OLPC. That is, the transmission power of the uplink data channel signal is determined based on OLPC.

Equation (1) may be changed to Equation (2). In Equation (2), α, β, γ, δ, and ε are variables that may be varied according to the situation of the OFDMA communication system.

$$P\_data(dBm) = \alpha \times NI + \beta \times L_1 + \gamma \times SINR_{Target} + \delta \times \text{Offset} + \epsilon \quad (2)$$

The transmission power of the uplink control channel is controlled by Equation (3):

$$P\_control(dBm) = NI + L_2 + SINR_{Target} + \text{Offset}_{CLPC} \quad (3)$$

where P_control denotes an uplink transmission power per subcarrier of an uplink control channel region allocated to the MS, $L_2$ denotes path loss on the link between the MS and the serving BS, and $\text{Offset}_{CLPC}$ denotes an offset value by which to calibrate the uplink transmission power of the uplink control channel signal. Herein, P_control is expressed in dBm and $L_2$ is expressed in dB. The MS receives a measurement-related parameter and determines $L_2$ using the received measurement-related parameter. $\text{Offset}_{CLPC}$, which is expressed in dB, may be changed by the serving BS. Although both $L_2$ and $L_1$ represent path loss of the link between the MS and the serving BS, the serving BS may set different parameters for use in determining $L_2$ and $L_1$ at the MS.

Equation (3) is determined according to CLPC. That is, the transmission power of the uplink control channel signal is determined based on CLPC.

Equation (3) may be changed to Equation (4). In Equation (3), $\alpha$, $\beta$, $\gamma$, $\delta$, $\epsilon$ and $\eta$ are variables that may be varied according to the situation of the OFDMA communication system.

$$P\_control(dBm) = \alpha \times NI + \beta \times L_2 + \gamma \times SINR_{Target} + \delta \times Offset_{CLPC} + \eta \quad (4)$$

$Offset_{CLPC}$ may be expressed as:

$$Offset_{CLPC} = Offset_{CLPC} + \Delta_{PowerAdjust} \quad (5)$$

where $\Delta_{PowerAdjust}$ denotes a power correction value for correcting OffsetCLPC.

Figure 2:
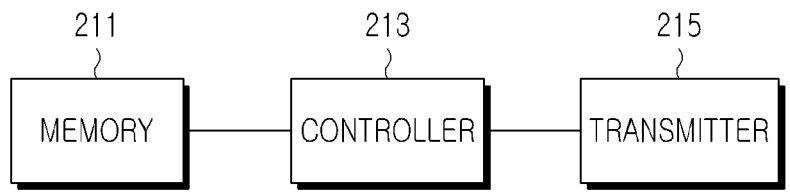
FIG. 2 is a block diagram of a Base Station (BS) according to an exemplary embodiment of the present invention.

With reference to FIG. 2, a configuration of a BS according to an exemplary embodiment of the present invention will be described.

FIG. 2 is a block diagram of a BS according to an exemplary embodiment of the present invention.

Referring to FIG. 2, the BS includes a memory 211, a controller 213, and a transmitter 215.

The memory 211 stores parameters needed for MSs to use OLPC and CLPC, for example, NI, Offset, $Offset_{CLPC}$, $\Delta_{PowerAdjust}$ and the like. The controller 213 controls the transmitter 215 to transmit to the MSs the parameters needed for MSs to use OLPC and CLPC. More particularly, the controller 213 determines $Offset_{CLPC}$ and $\Delta_{PowerAdjust}$ using feedback information received from the MSs and determines the parameters needed for the MSs to use OLPC and CLPC, taking into account uplink interference levels.

While the memory 211, the controller 213 and the transmitter 215 are shown in FIG. 2 as separate blocks, it is to be understood that this is for merely convenience of description. That is, the memory 211, the controller 213 and the transmitter 215 may be incorporated into a single block.

Figure 3:
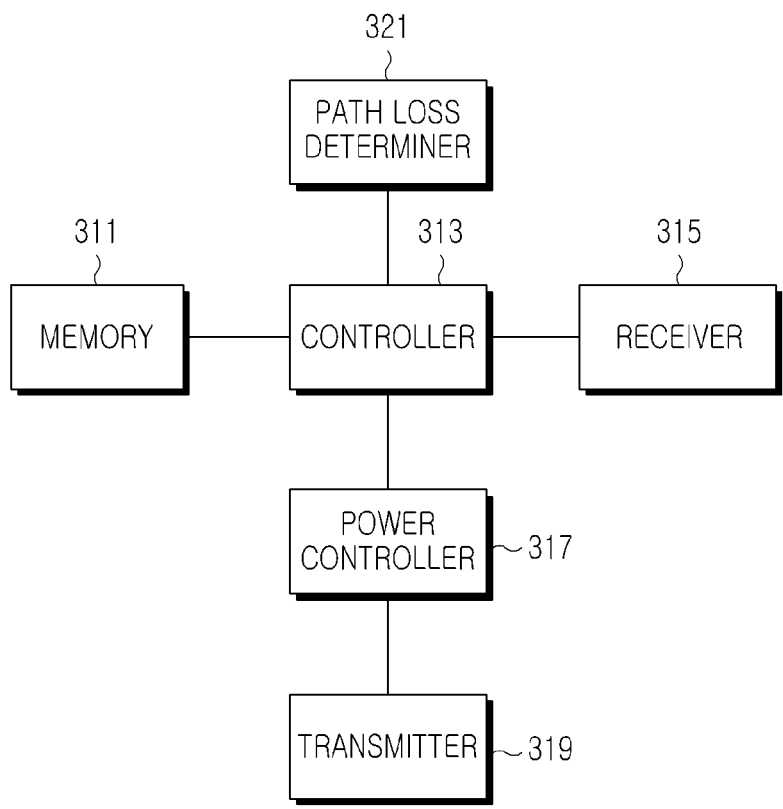
FIG. 3 is a block diagram of a Mobile Station (MS) according to an exemplary embodiment of the present invention.

With reference to FIG. 3, a configuration of an MS according to an exemplary embodiment of the present invention will be described.

FIG. 3 is a block diagram of an MS according to an exemplary embodiment of the present invention.

Referring to FIG. 3, the MS includes a memory 311, a controller 313, a receiver 315, a power controller 317, a transmitter 319, and a path loss determiner 321.

The memory 311 stores parameters needed to use OLPC and CLPC, for example, NI, Offset, $Offset_{CLPC}$, $\Delta_{PowerAdjust}$, and the like. These parameters are received through the receiver 315, for example from a BS. The controller 313 controls the power controller 317 to control the transmission power of an uplink channel signal using the parameters. If an uplink channel signal to be transmitted by the transmitter 319 is an uplink data channel signal, the controller 313 determines the transmission power of the uplink data channel signal according to OLPC. On the other hand, if an uplink channel signal to be transmitted by the transmitter 319 is an uplink control channel signal, the controller 313 determines the transmission power of the uplink control channel signal according to CLPC. That is, the controller 313 determines the transmission power of the uplink data channel signal using Equation (1) or Equation (2) and the transmission power of the uplink control channel signal using Equation (3) or Equation (4).

The path loss determiner 321 determines path loss under the control of the controller 313. In an exemplary implementation, the path loss is determined in a different manner depending on whether OLPC or CLPC is employed. A parameter used for determining the path loss may be received from the BS.

While the memory 311, the controller 313, the receiver 315, the power controller 317, the transmitter 319, and the path loss measurer 321 are shown in FIG. 3 as separate blocks, it is to be understood that this is for merely convenience of description. That is, the memory 311, the controller 313, the receiver 315, the power controller 317, the transmitter 319, and the path loss measurer 321 may be incorporated into a single block.

Figure 4:
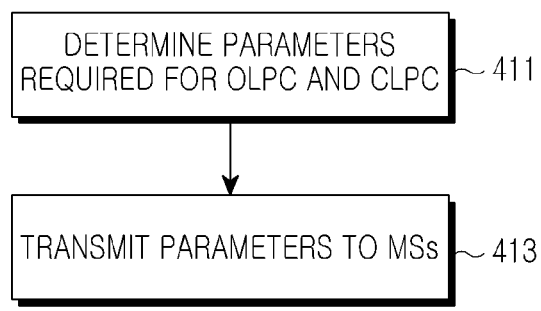
FIG. 4 is a flowchart illustrating an operation of a BS according to an exemplary embodiment of the present invention.

With reference to FIG. 4, an operation of a BS according to an exemplary embodiment of the present invention will be described.

FIG. 4 is a flowchart illustrating an operation of a BS according to an exemplary embodiment of the present invention.

Referring to FIG. 4, the BS determines parameters needed for OLPC and CLPC in step 411. The parameters and exemplary methods for determining the parameters have been described above with reference to FIG. 2 and thus their description is not provided herein.

In step 413, the BS transmits the determined parameters to MSs. In an exemplary implementation, parameters necessary for OLPC are broadcast, whereas parameters necessary for CLPC are unicast to a particular MS.

Figure 5:
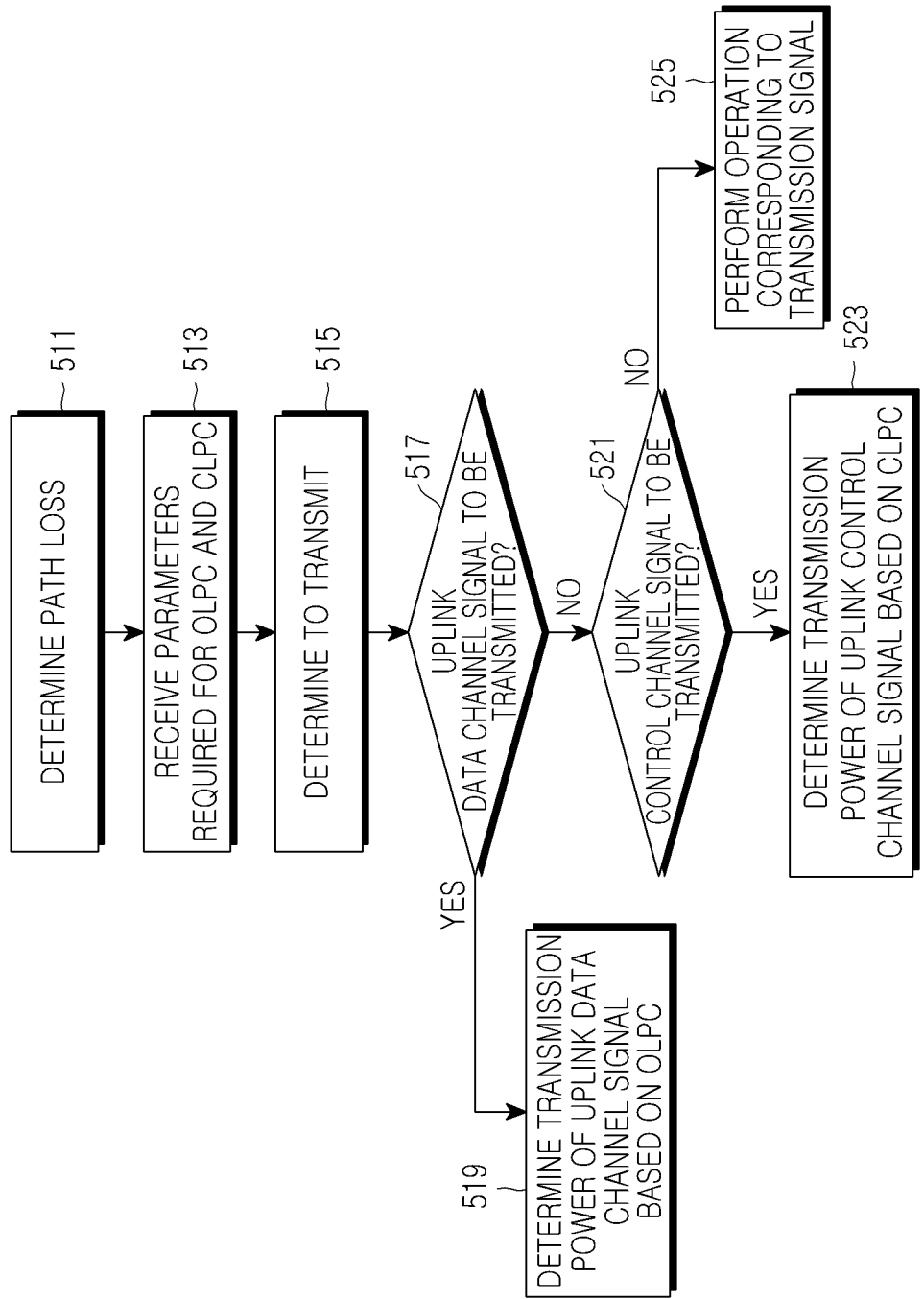
FIG. 5 is a flowchart illustrating an operation of an MS according to an exemplary embodiment of the present invention.

With reference to FIG. 5, an operation of an MS according to an exemplary embodiment of the present invention will be described below.

FIG. 5 is a flowchart illustrating an operation of an MS according to an exemplary embodiment of the present invention.

Referring to FIG. 5, the MS determines path loss in step 511. In an exemplary implementation, the path loss may be determined in a different manner depending on whether uplink power control is performed in OLPC or CLPC, which has been described above. In step 513, the MS receives parameters necessary for OLPC and CLPC. The MS determines to perform a transmission operation in step 515 and determines whether an uplink data channel signal is to be transmitted in step 517. If it is determined in step 517 that an uplink data channel signal is to be transmitted, the MS determines the transmission power of the uplink data channel signal according to OLPC in step 519. The transmission power of the uplink data channel signal is determined using Equation (1) or Equation (2).

On the other hand, if it is determined in step 517 that an uplink data channel signal is not to be transmitted during the transmission operation, the MS determines whether an uplink control channel signal is to be transmitted during the transmission operation in step 521. If it is determined in step 521 that an uplink control channel signal is to be transmitted during the transmission operation, the MS determines the transmission power of the uplink control channel signal according to CLPC in step 523. The transmission power of the uplink control channel signal is determined using Equation (3) or Equation (4).

On the other hand, if it is determined in step 521 that an uplink control channel signal is not to be transmitted during the transmission operation, the MS performs an operation corresponding to a transmission signal in step 525, which is not related directly to the present invention and thus will not be described.

As is apparent from the above description of exemplary embodiments of the present invention, a communication system can control uplink transmission power differentially for each uplink channel. Therefore, uplink power can be controlled based on channel characteristics and the overall performance of the communication system is increased.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling uplink transmission power at a Mobile Station (MS) in a communication system, the method comprising:
determining transmission power of an uplink data channel signal based on a first offset; and
determining transmission power of an uplink control channel signal based on a second offset,
wherein the first offset and the second offset are received from a Base Station (BS), and
wherein the determining of the transmission power of the uplink control channel signal based on the second offset comprises determining the transmission power of the uplink control channel signal based on an interference and noise level per subcarrier, a path loss of a link between the MS and the BS, a target uplink reception Signal-to-Interference and Noise Ratio (SINR), and the second offset.

2. The method of claim 1, wherein the determining of the transmission power of the uplink data channel signal based on the first offset comprises determining the transmission power of the uplink data channel signal based on the interference and noise level per subcarrier, the path loss of the link between the MS and the BS, the target uplink reception SINR, and the first offset.

3. The method of claim 2, wherein the path loss is measured based on a first parameter broadcast by the BS, and the first parameter is different from a second parameter used for measuring the path loss when determining the transmission power of the uplink control channel signal.

4. The method of claim 3, wherein the determining of the transmission power of the uplink data channel signal based on the first offset is expressed as one of the following equations, $$P\_data(dBm) = NI + L_1 + SINR_{Target} + \text{Offset}$$

where P_data denotes transmission power per subcarrier of an uplink data channel region allocated to the MS, NI denotes the interference and noise level per subcarrier, $L_1$ denotes the path loss on the link between the MS and the BS, SINRTarget denotes the target uplink reception SINR, and Offset denotes the first offset, and $$P\_data(dBm) = \alpha \times NI + \beta \times L_1 + \gamma \times SINR_{Target} + \delta \times \text{Offset} + \epsilon$$

where $\alpha$, $\beta$, $\gamma$, $\delta$, and $\epsilon$ are variables.

5. The method of claim 4, wherein $L_1$ is measured based on a first parameter broadcast by the BS, and the first parameter is different from a second parameter used for measuring the path loss used for determining the transmission power of the uplink control channel signal.

6. The method of claim 3, wherein the determining of the transmission power of the uplink control channel signal based on the second offset is expressed as one of the following equations, $$P\_control(dBm) = NI + L_2 + SINR_{Target} + \text{Offset}_{CLPC}$$

where P_control denotes transmission power per subcarrier of an uplink control channel region allocated to the MS, $L_2$ denotes the path loss on the link between the MS and the BS, SINRTarget denotes the target uplink reception SINR, and OffsetCLPC denotes the second offset, and $$P\_control(dBm) = \alpha \times NI + \beta \times L_2 + \gamma \times SINR_{Target} + \delta \times \text{Offset}_{CLPC} + \eta$$

where $\alpha$, $\beta$, $\gamma$, $\delta$, $\epsilon$, and $\eta$ are variables.

7. The method of claim 6, wherein OffsetCLPC is expressed as the following equation, $$\text{Offset}_{CLPC} = \text{Offset}_{CLPC} + \Delta_{PowerAdjust}$$

where $\Delta_{PowerAdjust}$ denotes a power correction value for correcting OffsetCLPC, and is received from the BS.

8. The method of claim 7, wherein $L_2$ is measured based on a first parameter broadcast by the BS, and the first parameter is different from a second parameter used for measuring the path loss used for determining the transmission power of the uplink data channel signal.

9. The method of claim 3, wherein the determining of the transmission power of the uplink data channel signal based on the first offset is expressed as one of the following equations, $$P\_data(dBm) = NI + L_1 + SINR_{Target} + \text{Offset}$$

where P_data denotes transmission power per subcarrier of an uplink data channel region allocated to the MS, NI denotes the interference and noise level per subcarrier, $L_1$ denotes the path loss on the link between the MS and the BS, SINRTarget denotes a target uplink reception SINR, and Offset denotes the first offset, and $$P\_data(dBm) = \alpha \times NI + \beta \times L_1 + \gamma \times SINR_{Target} + \delta \times \text{Offset} + \epsilon$$

where $\alpha$, $\beta$, $\gamma$, $\delta$, and $\epsilon$ are variables,
wherein the determining of the transmission power of the uplink control channel signal based on the second offset is expressed as one of the following equations:

$$P\_control(dBm) = NI + L_2 + SINR_{Target} + \text{Offset}_{CLPC}$$

where P_control denotes transmission power per subcarrier of an uplink control channel region allocated to the MS, $L_2$ denotes the path loss on the link between the MS and the BS, and OffsetCLPC denotes the second offset, and $$P\_control(dBm) = \alpha \times NI + \beta \times L_2 + \gamma \times SINR_{Target} + \delta \times \text{Offset}_{CLPC} + \eta$$

where $\eta$ is a variable.

10. The method of claim 9, wherein OffsetCLPC is expressed as the following equation, $$\text{Offset}_{CLPC} = \text{Offset}_{CLPC} + \Delta_{PowerAdjust}$$

where $\Delta_{PowerAdjust}$ denotes a power correction value for correcting OffsetCLPC, and is received from the BS.

11. The method of claim 9, wherein $L_1$ is measured based on a first parameter broadcast by the BS, and the first parameter is different from a second parameter used for measuring the path loss used for determining the transmission power of the uplink control channel signal.

12. The method of claim 11, wherein $L_2$ is measured based on a third parameter broadcast by the BS, and the third parameter is different from a fourth parameter used for measuring the path loss used for determining the transmission power of the uplink data channel signal.

13. The method of claim 11, wherein OffsetCLPC is expressed as the following equation, $$\text{Offset}_{CLPC} = \text{Offset}_{CLPC} + \Delta_{PowerAdjust}$$

where $\Delta_{PowerAdjust}$ denotes a power correction value for correcting OffsetCLPC, and is received from the BS.

14. The method of claim 13, wherein $L_2$ is measured based on a third parameter broadcast by the BS, and the third parameter is different from a fourth parameter used for measuring the path loss for determining the transmission power of the uplink data channel signal.

15. The method of claim 2, wherein the determining of the transmission power of the uplink data channel signal via the CLPC based on the first offset is expressed as one of the following equations, $$P\_data(dBm) = NI + L_1 + SINR_{Target} + Offset$$

where P_data denotes transmission power per subcarrier of an uplink data channel region allocated to the MS, NI denotes the interference and noise level per subcarrier, $L_1$ denotes the path loss on the link between the MS and the BS, SINRTarget denotes the target uplink reception SINR, and Offset denotes the first offset, and $$P\_data(dBm) = \alpha \times NI + \beta \times L_1 + \gamma \times SINR_{Target} + \delta \times Offset + \epsilon$$

where $\alpha$, $\beta$, $\gamma$, $\delta$, and $\epsilon$ are variables.

16. The method of claim 15, wherein $L_1$ is measured based on a first parameter broadcast by the BS, and the first parameter is different from a second parameter used for measuring the path loss used for determining the transmission power of the uplink control channel signal.

17. The method of claim 2, wherein the determining of the transmission power of the uplink control channel signal based on the second offset is expressed as one of the following equations, $$P\_control(dBm) = NI + L_2 + SINR_{Target} + Offset_{CLPC}$$

where P_control denotes transmission power per subcarrier of an uplink control channel region allocated to the MS, $L_2$ denotes the path loss on the link between the MS and the BS, SINRTarget denotes the target uplink reception SINR, and OffsetCLPC denotes the second offset, and $$P\_control(dBm) = \alpha \times NI + \beta \times L_2 + \gamma \times SINR_{Target} + \delta \times Offset_{CLPC} + \eta$$

where $\alpha$, $\beta$, $\gamma$, $\delta$, $\epsilon$, and $\eta$ are variables.

18. The method of claim 17, wherein $L_2$ is measured based on a first parameter broadcast by the BS, and the first parameter is different from a second parameter used for measuring the path loss used for determining the transmission power of the uplink data channel signal.

19. The method of claim 17, wherein OffsetCLPC is expressed as the following equation, $$Offset_{CLPC} = Offset_{CLPC} + \Delta_{PowerAdjust}$$

where $\Delta_{PowerAdjust}$ denotes a power correction value for correcting OffsetCLPC, and is received from the BS.

20. The method of claim 19, wherein $L_2$ is measured based on a first parameter broadcast by the BS, and the first parameter is different from a second parameter used for measuring the path loss used for determining the transmission power of the uplink data channel signal.

21. The method of claim 2, wherein the determining of the transmission power of the uplink data channel signal based on the first offset is expressed as one of the following equations, $$P\_data(dBm) = NI + L_1 + SINR_{Target} + Offset$$

where P_data denotes transmission power per subcarrier of an uplink data channel region allocated to the MS, NI denotes the interference and noise level per subcarrier, $L_1$ denotes the path loss on the link between the MS and the BS, SINRTarget denotes a target uplink reception SINR, and Offset denotes the first offset, and $$P\_data(dBm) = \alpha \times NI + \beta \times L_1 + \gamma \times SINR_{Target} + \delta \times Offset + \epsilon$$

where $\alpha$, $\beta$, $\gamma$, $\delta$, and $\epsilon$ are variables, wherein the determining of the transmission power of the uplink control channel signal based on the second offset is expressed as one of the following equations:

$$P\_control(dBm) = NI + L_2 + SINR_{Target} + Offset_{CLPC}$$

where P_control denotes transmission power per subcarrier of an uplink control channel region allocated to the MS, $L_2$ denotes the path loss on the link between the MS and the BS, and OffsetCLPC denotes the second offset; and $$P\_control(dBm) = \alpha \times NI + \beta \times L_2 + \gamma \times SINR_{Target} + \delta \times Offset_{CLPC} + \eta$$

where $\eta$ is a variable.

22. The method of claim 21, wherein OffsetCLPC is expressed as the following equation, $$Offset_{CLPC} = Offset_{CLPC} + \Delta_{PowerAdjust}$$

where $\Delta_{PowerAdjust}$ denotes a power correction value for correcting OffsetCLPC, and is received from the BS.

23. The method of claim 21, wherein $L_1$ is measured based on a first parameter broadcast by the BS, and the first parameter is different from a second parameter used for measuring the path loss used for determining the transmission power of the uplink control channel signal.

24. The method of claim 23, wherein $L_2$ is measured based on a third parameter broadcast by the BS, and the third parameter is different from a fourth parameter used for measuring the path loss used for determining the transmission power of the uplink data channel signal.

25. The method of claim 23, wherein OffsetCLPC is expressed as the following equation, $$Offset_{CLPC} = Offset_{CLPC} + \Delta_{PowerAdjust}$$

where $\Delta_{PowerAdjust}$ denotes a power correction value for correcting OffsetCLPC, and is received from the BS.

26. The method of claim 25, wherein $L_2$ is measured based on a first parameter broadcast by the BS, and the first parameter is different from a second parameter used for measuring the path loss used for determining the transmission power of the uplink data channel signal.

27. The method of claim 1, wherein the determining of the transmission power of the uplink data channel signal based on the first offset is expressed as one of the following equations, $$P\_data(dBm) = NI + L_1 + SINR_{Target} + Offset$$

where P_data denotes transmission power per subcarrier of an uplink data channel region allocated to the MS, NI denotes the interference and noise level per subcarrier, $L_1$ denotes the path loss on the link between the MS and the BS, SINRTarget denotes the target uplink reception SINR, and Offset denotes the first offset, and $$P\_data(dBm) = \alpha \times NI + \beta \times L_1 + \gamma \times SINR_{Target} + \delta \times Offset + \epsilon$$

where $\alpha$, $\beta$, $\gamma$, $\delta$, and $\epsilon$ are variables.

28. The method of claim 27, wherein $L_1$ is measured based on a first parameter broadcast by the BS, and the first parameter is different from a second parameter used for measuring the path loss used for determining the transmission power of the uplink control channel signal.

29. The method of claim 1, wherein the determining of the transmission power of the uplink control channel signal based on the second offset is expressed as one of the following equations, $$P\_data(dBm) = NI + L_2 + SINR_{Target} + Offset_{CLPC}$$

where P_control denotes transmission power per subcarrier of an uplink control channel region allocated to the MS, $L_2$ denotes the path loss on the link between the MS and the BS, SINRTarget denotes the target uplink reception SINR, and OffsetCLPC denotes the second offset, and $$P\_data(dBm) = \alpha \times NI + \beta \times L_2 + \gamma \times SINR_{Target} + \delta \times Offset_{CLPC} + \eta$$

where $\alpha, \beta, \gamma, \delta, \epsilon$, and $\eta$ are variables.

30. The method of claim 29, wherein $L_2$ is measured based on a first parameter broadcast by the BS, and the first parameter is different from a second parameter used for measuring the path loss used for determining the transmission power of the uplink data channel signal.

31. The method of claim 29, wherein OffsetCLPC is expressed as the following equation, $$Offset_{CLPC} = Offset_{CLPC} + \Delta_{PowerAdjust}$$

where $\Delta_{PowerAdjust}$ denotes a power correction value for correcting OffsetCLPC, and is received from the BS.

32. The method of claim 31, wherein $L_2$ is measured based on a first parameter broadcast by the BS, and the first parameter is different from a second parameter used for measuring the path loss used for determining the transmission power of the uplink data channel signal.

33. The method of claim 1, wherein the determining of the transmission power of the uplink data channel signal based on the first offset is expressed as one of the following equations:

$$P\_data(dBm) = NI + L_1 + SINR_{Target} + Offset$$

where P_data denotes transmission power per subcarrier of an uplink data channel region allocated to the MS, NI denotes the interference and noise level per subcarrier, $L_1$ denotes the path loss on the link between the MS and the BS, SINRTarget denotes the target uplink reception SINR, and Offset denotes the first offset, and $$P\_data(dBm) = \alpha \times NI + \beta \times L_1 + \gamma \times SINR_{Target} + \delta \times Offset + \epsilon$$

where $\alpha, \beta, \gamma, \delta$, and $\epsilon$ are variables, wherein the determining of the transmission power of the uplink control channel signal based on the second offset is expressed as one of the following equations, $$P\_control(dBm) = NI + L_2 + SINR_{Target} + Offset_{CLPC}$$

where P_control denotes transmission power per subcarrier of an uplink control channel region allocated to the MS, $L_2$ denotes the path loss on the link between the MS and the BS, and OffsetCLPC denotes the second offset, and $$P\_control(dBm) = \alpha \times NI + \beta \times L_2 + \gamma \times SINR_{Target} + \delta \times Offset_{CLPC} + \eta$$

where $\eta$ is a variable.

34. The method of claim 33, wherein OffsetCLPC is expressed as the following equation, $$Offset_{CLPC} = Offset_{CLPC} + \Delta_{PowerAdjust}$$

where $\Delta_{PowerAdjust}$ denotes a power correction value for correcting OffsetCLPC, and is received from the BS.

35. The method of claim 33, wherein $L_1$ is measured based on a first parameter broadcast by the BS, and the first parameter is different from a second parameter used for measuring the path loss used for determining the transmission power of the uplink control channel signal.

36. The method of claim 35, wherein $L_2$ is measured based on a third parameter broadcast by the BS, and the third parameter is different from a fourth parameter used for measuring the path loss used for determining the transmission power of the uplink data channel signal.

37. The method of claim 35, wherein OffsetCLPC is expressed as the following equation, $$Offset_{CLPC} = Offset_{CLPC} + \Delta_{PowerAdjust}$$

where $\Delta_{PowerAdjust}$ denotes a power correction value for correcting OffsetCLPC, and is received from the BS.

38. The method of claim 37, wherein $L_2$ is measured based on a third parameter broadcast by the BS, and the third parameter is different from a fourth parameter used for measuring the path loss used for determining the transmission power of the uplink data channel signal.

39. A method for controlling uplink transmission power for a Mobile Station (MS) at a Base Station (BS) in a communication system, the method comprising:
  determining a first offset used if an MS determines transmission power of an uplink data channel
  determining a second offset used if the MS determines transmission power of an uplink control channel signal; and
  transmitting the first offset and the second offset to the MS.

40. A Mobile Station (MS) in a communication system, comprising:
  a controller for determining transmission power of an uplink data channel signal based on a first offset, and determining transmission power of an uplink control channel signal based on a second offset,
  wherein the first offset and the second offset are received from a Base Station (BS), and
  wherein the controller determines the transmission power of the uplink control channel signal based on an interference and noise level per subcarrier, a path loss of a link between the MS and the BS, a target uplink reception Signal-to-Interference and Noise Ratio (SINR), and the second offset.

41. The MS of claim 40, wherein the controller determines the transmission power of the uplink data channel signal based on the interference and noise level per subcarrier, the path loss of a link between the MS and the BS, the target uplink reception SINR, and the first offset.

42. The MS of claim 41, wherein the path loss is measured based on a first parameter broadcast by the BS, and the first parameter is different from a second parameter used for measuring the path loss when determining the transmission power of the uplink control channel signal.

43. The MS of claim 42, wherein the controller determines the transmission power of the uplink data channel signal based on one of the following equations, $$P\_data(dBm) = NI + L_1 + SINR_{Target} + Offset$$

where P_data denotes transmission power per subcarrier of an uplink data channel region allocated to the MS, NI denotes the interference and noise level per subcarrier, $L_1$ denotes the path loss on the link between the MS and the BS, SINRTarget denotes the target uplink reception SINR, and Offset denotes the first offset, and $$P\_data(dBm) = \alpha \times NI + \beta \times L_1 + \gamma \times SINR_{Target} + \delta \times Offset + \epsilon$$

where $\alpha, \beta, \gamma, \delta$, and $\epsilon$ are variables.

44. The MS of claim 43, wherein $L_1$ is measured based on a first parameter broadcast by the BS, and the first parameter is different from a second parameter used for measuring the path loss used for determining the transmission power of the uplink control channel signal.

45. The MS of claim 42, wherein the controller determines the transmission power of the uplink control channel signal based on one of the following equations, $$P\_data(dBm)=NI+L_1+SINR_{Target}+Offset$$

where P_control denotes transmission power per subcarrier of an uplink control channel region allocated to the MS, $L_2$ denotes the path loss on the link between the MS and the BS, SINRTarget denotes the target uplink reception SINR, and OffsetCLPC denotes the second offset, and $$P\_data(dBm)=\alpha \times NI+\beta \times L_1+\gamma \times SINR_{Target}+\delta \times Offset+\epsilon$$

where $\alpha, \beta, \gamma, \delta, \epsilon$, and $\eta$ are variables.

46. The MS of claim 45, wherein OffsetCLPC is expressed as the following equation, $$Offset_{CLPC}=Offset_{CLPC}+\Delta_{PowerAdjust}$$

where $\Delta_{PowerAdjust}$ denotes a power correction value for correcting OffsetCLPC, and is received from the BS.

47. The MS of claim 46, wherein $L_2$ is measured based on a first parameter broadcast by the BS, and the first parameter is different from a second parameter used for measuring the path loss used for determining the transmission power of the uplink data channel signal.

48. The MS of claim 42, wherein the controller determines the transmission power of the uplink data channel signal based on one of the following equations, $$P\_data(dBm)=NI+L_1+SINR_{Target}+Offset$$

where P_data denotes transmission power per subcarrier of an uplink data channel region allocated to the MS, NI denotes the interference and noise level per subcarrier, $L_1$ denotes the path loss on the link between the MS and the BS, SINRTarget denotes a target uplink reception SINRSINR, and Offset denotes the first offset, and $$P\_data(dBm)=\alpha \times NI+\beta \times L_1+\gamma \times SINR_{Target}+\delta \times Offset+\epsilon$$

where $\alpha, \beta, \gamma, \delta$, and $\epsilon$ are variables, wherein the controller determines the transmission power of the uplink control channel signal based on one of the following equations, $$P\_control(dBm)=NI+L_2+SINR_{Target}+Offset_{CLPC}$$

where P_control denotes transmission power per subcarrier of an uplink control channel region allocated to the MS, $L_2$ denotes the path loss on the link between the MS and the BS, and OffsetCLPC denotes the second offset, and $$P\_control(dBm)=\alpha \times NI+\beta \times L_2+\gamma \times SINR_{Target}+\delta \times Offset_{CLPC}+\eta$$

where $\eta$ is a variable.

49. The MS of claim 48, wherein OffsetCLPC is expressed as the following equation, $$Offset_{CLPC}=Offset_{CLPC}+\Delta_{PowerAdjust}$$

where $\Delta_{PowerAdjust}$ denotes a power correction value for correcting OffsetCLPC, and is received from the BS.

50. The MS of claim 48, wherein $L_1$ is measured based on a first parameter broadcast by the BS, and the first parameter is different from a second parameter used for measuring the path loss used for determining the transmission power of the uplink control channel signal.

51. The MS of claim 50, wherein $L_2$ is measured based on a third parameter broadcast by the BS, and the third parameter is different from a fourth parameter used for measuring the path loss used for determining the transmission power of the uplink data channel signal.

52. The MS of claim 50, wherein OffsetCLPC is expressed as the following equation, $$Offset_{CLPC}=Offset_{CLPC}+\Delta_{PowerAdjust}$$

where $\Delta_{PowerAdjust}$ denotes a power correction value for correcting OffsetCLPC, and is received from the BS.

53. The MS of claim 52, wherein $L_2$ is measured based on a third parameter broadcast by the BS, and the third parameter is different from a fourth parameter used for measuring the path loss used for determining the transmission power of the uplink data channel signal.

54. The MS of claim 41, wherein the controller determines the transmission power of the uplink data channel signal based on one of the following equations, $$P\_data(dBm)=NI+L_1+SINR_{Target}+Offset$$

where P_data denotes transmission power per subcarrier of an uplink data channel region allocated to the MS, NI denotes the interference and noise level per subcarrier, $L_1$ denotes the path loss on the link between the MS and the BS, SINRTarget denotes the target uplink reception SINR, and Offset denotes the first offset, and $$P\_data(dBm)=\alpha \times NI+\beta \times L_1+\gamma \times SINR_{Target}+\delta \times Offset+\epsilon$$

where $\alpha, \beta, \gamma, \delta$, and $\epsilon$ are variables.

55. The MS of claim 54, wherein $L_1$ is measured based on a first parameter broadcast by the BS, and the first parameter is different from a second parameter used for measuring the path loss used for determining the transmission power of the uplink control channel signal.

56. The MS of claim 41, wherein the controller determines the transmission power of the uplink control channel signal based on one of the following equations, $$P\_data(dBm)=NI+L_1+SINR_{Target}+Offset$$

where P_control denotes transmission power per subcarrier of an uplink control channel region allocated to the MS, $L_2$ denotes the path loss on the link between the MS and the BS, SINRTarget denotes the target uplink reception, and OffsetCLPC denotes the second offset, and $$P\_data(dBm)=\alpha \times NI+\beta \times L_1+\gamma \times SINR_{Target}+\delta \times Offset+\epsilon$$

where $\alpha, \beta, \gamma, \delta, \epsilon$, and $\eta$ are variables.

57. The MS of claim 56, wherein $L_2$ is measured based on a first parameter broadcast by the BS, and the first parameter is different from a second parameter used for measuring the path loss used for determining the transmission power of the uplink data channel signal.

58. The MS of claim 56, wherein OffsetCLPC is expressed as the following equation, $$Offset_{CLPC}=Offset_{CLPC}+\Delta_{PowerAdjust}$$

where $\Delta_{PowerAdjust}$ denotes a power correction value for correcting OffsetCLPC, and is received from the BS.

59. The MS of claim 58, wherein $L_2$ is measured based on a first parameter broadcast by the BS, and the first parameter is different from a second parameter used for measuring the path loss used for determining the transmission power of the uplink data channel signal.

60. The MS of claim 41, wherein the controller determines the transmission power of the uplink data channel signal based on one of the following equations, $$P\_data(dBm) = NI + L_1 + SINR_{Target} + Offset$$

where P_data denotes transmission power per subcarrier of an uplink data channel region allocated to the MS, NI denotes the interference and noise level per subcarrier, $L_1$ denotes the path loss on the link between the MS and the BS, SINRTarget denotes a target uplink reception SINR, and Offset denotes the first offset, and $$P\_data(dBm) = \alpha \times NI + \beta \times L_1 + \gamma \times SINR_{Target} + \delta \times Offset + \epsilon$$

where $\alpha$, $\beta$, $\gamma$, $\delta$, and $\epsilon$ are variables,
wherein the controller determines the transmission power of the uplink control channel signal based on one of the following equations, $$P\_control(dBm) = NI + L_2 + SINR_{Target} + Offset_{CLPC}$$

where P_control denotes transmission power per subcarrier of an uplink control channel region allocated to the MS, $L_2$ denotes the path loss on the link between the MS and the BS, and OffsetCLPC denotes the second offset, and $$P\_control(dBm) = \alpha \times NI + \beta \times L_2 + \gamma \times SINR_{Target} + \delta \times Offset_{CLPC} + \eta$$

where $\eta$ is a variable.

61. The MS of claim 60, wherein OffsetCLPC is expressed as the following equation, $$Offset_{CLPC} = Offset_{CLPC} + \Delta_{PowerAdjust}$$

where $\Delta_{PowerAdjust}$ denotes a power correction value for correcting OffsetCLPC, and is received from the BS.

62. The MS of claim 60, wherein $L_1$ is measured based on a first parameter broadcast by the BS, and the first parameter is different from a second parameter used for measuring the path loss used for determining the transmission power of the uplink control channel signal.

63. The MS of claim 62, wherein $L_2$ is measured based on a third parameter broadcast by the BS, and the third parameter is different from a fourth parameter used for measuring the path loss used for determining the transmission power of the uplink data channel signal.

64. The MS of claim 62, wherein OffsetCLPC is expressed as the following equation, $$Offset_{CLPC} = Offset_{CLPC} + \Delta_{PowerAdjust}$$

where $\Delta_{PowerAdjust}$ denotes a power correction value for correcting OffsetCLPC, and is received from the BS.

65. The MS of claim 64, wherein $L_2$ is measured based on a third parameter broadcast by the BS, and the third parameter is different from a fourth parameter used for measuring the path loss used for determining the transmission power of the uplink data channel signal.

66. The MS of claim 40, wherein the controller determines the transmission power of the uplink data channel signal based on one of the following equations, $$P\_data(dBm) = NI + L_1 + SINR_{Target} + Offset$$

where P_data denotes transmission power per subcarrier of an uplink data channel region allocated to the MS, NI denotes the interference and noise level per subcarrier, $L_1$ denotes the path loss on the link between the MS and the BS, SINRTarget denotes the target uplink reception SINR, and Offset denotes the first offset, and $$P\_data(dBm) = \alpha \times NI + \beta \times L_1 + \gamma \times SINR_{Target} + \delta \times Offset + \epsilon$$

where $\alpha$, $\beta$, $\gamma$, $\delta$, and $\epsilon$ are variables.

67. The MS of claim 66, wherein $L_1$ is measured based on a first parameter broadcast by the BS, and the first parameter is different from a second parameter used for measuring the path loss used for determining the transmission power of the uplink control channel signal.

68. The MS of claim 40, wherein the controller determines the transmission power of the uplink control channel signal based on one of the following equations, $$P\_data(dBm) = NI + L_1 + SINR_{Target} + Offset$$

where P_control denotes transmission power per subcarrier of an uplink control channel region allocated to the MS, $L_2$ denotes the path loss on the link between the MS and the BS, SINRTarget denotes the target uplink reception SINR, and OffsetCLPC denotes the second offset, and $$P\_data(dBm) = \alpha \times NI + \beta \times L_1 + \gamma \times SINR_{Target} + \delta \times Offset + \epsilon$$

where $\alpha$, $\beta$, $\gamma$, $\delta$, $\epsilon$, and $\eta$ are variables.

69. The MS of claim 68, wherein $L_2$ is measured based on a first parameter broadcast by the BS, and the first parameter is different from a second parameter used for measuring the path loss used for determining the transmission power of the uplink data channel signal.

70. The MS of claim 68, wherein OffsetCLPC is expressed as the following equation, $$Offset_{CLPC} = Offset_{CLPC} + \Delta_{PowerAdjust}$$

where $\Delta_{PowerAdjust}$ denotes a power correction value for correcting OffsetCLPC, and is received from the BS.

71. The MS of claim 70, wherein $L_2$ is measured based on a first parameter broadcast by the BS, and the first parameter is different from a second parameter used for measuring the path loss used for determining the transmission power of the uplink data channel signal.

72. The MS of claim 40, wherein the controller determines the transmission power of the uplink data channel signal based on one of the following equations, $$P\_data(dBm) = NI + L_1 + SINR_{Target} + Offset$$

where P_data denotes transmission power per subcarrier of an uplink data channel region allocated to the MS, NI denotes the interference and noise level per subcarrier, $L_1$ denotes the path loss on the link between the MS and the BS, SINRTarget denotes the target uplink reception SINR, and Offset denotes the first offset, and $$P\_data(dBm) = \alpha \times NI + \beta \times L_1 + \gamma \times SINR_{Target} + \delta \times Offset + \epsilon$$

where $\alpha$, $\beta$, $\gamma$, $\delta$, and $\epsilon$ are variables,
wherein the controller determines the transmission power of the uplink control channel signal based on one of the following equations, $$P\_control(dBm) = NI + L_2 + SINR_{Target} + Offset_{CLPC}$$

where P_control denotes transmission power per subcarrier of an uplink control channel region allocated to the MS, $L_2$ denotes the path loss on the link between the MS and the BS, and OffsetCLPC denotes the second offset, and $$P\_control(dBm) = \alpha \times NI + \beta \times L_2 + \gamma \times SINR_{Target} + \delta \times Offset_{CLPC} + \eta$$

where $\eta$ is a variable.

73. The MS of claim 72, wherein OffsetCLPC is expressed as the following equation, $$Offset_{CLPC} = Offset_{CLPC} + \Delta_{PowerAdjust}$$

where $\Delta_{PowerAdjust}$ denotes a power correction value for correcting OffsetCLPC, and is received from the BS.

74. The MS of claim 72, wherein $L_1$ is measured based on a first parameter broadcast by the BS, and the first parameter is different from a second parameter used for measuring the path loss used for determining the transmission power of the uplink control channel signal.

75. The MS of claim 74, wherein $L_2$ is measured based on a third parameter broadcast by the BS, and the third parameter is different from a fourth parameter used for measuring the path loss used for determining the transmission power of the uplink data channel signal.

76. The MS of claim 74, wherein OffsetCLPC is expressed as the following equation, $$\text{Offset}_{CLPC} = \text{Offset}_{CLPC} + \Delta_{PowerAdjust}$$

where $\Delta_{PowerAdjust}$ denotes a power correction value for correcting OffsetCLPC, and is received from the BS.

77. The MS of claim 76, wherein $L_2$ is measured based on a third parameter broadcast by the BS, and the third parameter is different from a fourth parameter used for measuring the path loss used for determining the transmission power of the uplink data channel signal.

78. A Base Station (BS) in a communication system, comprising:
   a controller for determining a first offset used if a Mobile Station (MS) determines transmission power of an uplink data channel, and determining a second offset used if the MS determines transmission power of an uplink control channel signal; and
   a transmitter for transmitting the first offset and the second offset to the MS.

* * * * *